US012725287B2

(12) United States Patent
Deng

(10) Patent No.: US 12,725,287 B2
(45) Date of Patent: Sep. 1, 2026

(54) NAIL SHAPE EXTRACTION SYSTEM AND METHOD, STORAGE MEDIUM, AND NAIL STICKER AND MANUFACTURING SYSTEM THEREFOR

(71) Applicant: SHANGHAI HUIZI COSMETICS CO., LTD., Shanghai (CN)

(72) Inventor: Jingbiao Deng, Shanghai (CN)

(73) Assignee: SHANGHAI HUIZI COSMETICS CO., LTD., Shanghai (CN)

( * ) Notice: Subject to any disclaimer, the term of this patent is extended or adjusted under 35 U.S.C. 154(b) by 303 days.

(21) Appl. No.: 18/553,677

(22) PCT Filed: Aug. 12, 2021

(86) PCT No.: PCT/CN2021/112160

§ 371 (c)(1),
(2) Date: Oct. 2, 2023

(87) PCT Pub. No.: WO2023/015508

PCT Pub. Date: Feb. 16, 2023

(65) Prior Publication Data

US 2024/0202946 A1 Jun. 20, 2024

(51) Int. Cl.

| | |
|---|---|
| ***G06T 7/50*** | (2017.01) |
| ***A45D 29/00*** | (2006.01) |
| ***G06T 5/70*** | (2024.01) |

(52) U.S. Cl.

CPC .............. *G06T 7/50* (2017.01); *A45D 29/001* (2013.01); *G06T 5/70* (2024.01); *G06T 2207/10028* (2013.01)

(58) Field of Classification Search

CPC . G06T 7/50; G06T 2207/10028; G06V 20/64; G06V 20/695; G06V 40/107; A45D 29/00

See application file for complete search history.

(56) References Cited

U.S. PATENT DOCUMENTS

2021/0169197 A1* 6/2021 Zhang .................... B33Y 80/00
2021/0174121 A1* 6/2021 Li .......................... G06V 20/64
2024/0169689 A1* 5/2024 Deng ...................... G06T 7/187

FOREIGN PATENT DOCUMENTS

CN 109770520 5/2019
CN 112700479 4/2021

(Continued)

OTHER PUBLICATIONS

Rabbani, Tahir, Frank Van Den Heuvel, and George Vosselmann. "Segmentation of point clouds using smoothness constraint." International archives of photogrammetry, remote sensing and spatial information sciences 36, No. 5 (2006): 248-253. (Year: 2006).*

(Continued)

*Primary Examiner* — Stephen R Koziol
*Assistant Examiner* — Ashley Hytrek
(74) *Attorney, Agent, or Firm* — HSML P.C.

(57) ABSTRACT

A nail shape extraction system and method, a storage medium, a nail tip, and a manufacturing system for the nail tip are provided. The nail shape extraction system uses a cyclic processing device for point cloud extraction and/or flattening. The cyclic processing device includes a point cloud acquisition module configured to convert point cloud data into a point cloud list and a point cloud processing module configured to perform a cyclic action on points in the point cloud list under a determination condition to obtain a new point cloud list. The point cloud processing module includes a pushing unit, a selection unit, an action unit, an elimination unit, and a circulation unit for promoting the selection unit, the action unit, and the elimination unit to act cyclically.

13 Claims, 8 Drawing Sheets

(56) References Cited

FOREIGN PATENT DOCUMENTS

| | | | | |
|---|---|---|---|---|
| CN | 112949557 | | 6/2021 | |
| CN | 112949557 A | * | 6/2021 | ......... G06F 18/2135 |
| CN | 112949558 | | 6/2021 | |
| CN | 112990037 | | 6/2021 | |
| CN | 112700479 B | * | 2/2024 | ............... G06T 7/33 |
| WO | 2021/000719 | | 1/2021 | |

OTHER PUBLICATIONS

Mineo, Carmelo, Stephen Gareth Pierce, and Rahul Summan. "Novel algorithms for 3D surface point cloud boundary detection and edge reconstruction." Journal of Computational Design and Engineering 6, No. 1 (2019): 81-91. (Year: 2019).*

International Search Report, issued in the corresponding PCT application No. PCT/CN2021/112160, dated May 9, 2022, 5 pages with machine translation.

* cited by examiner

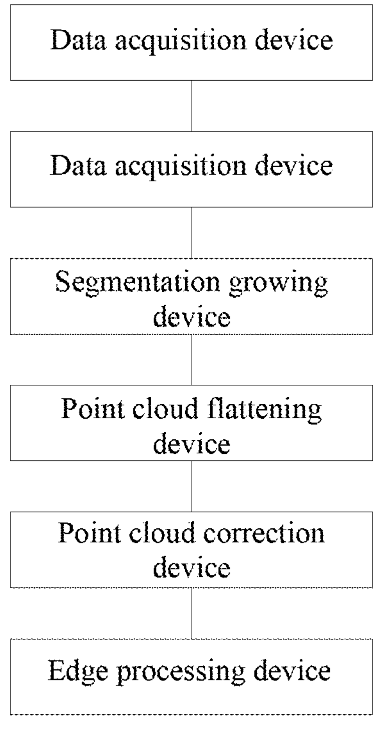

FIG. 1

Step of data acquisition: performing 3D scanning on a target finger by a data acquisition device to obtain finger 3D data $Data_{Finger}$ of the target finger, wherein the finger 3D data $Data_{Finger}$ at least comprises nail 3D data $Data_{Nail}$ of a whole nail;

Step of data conversion: converting the finger 3D data $Data_{Finger}$ into 3D point cloud data by a data conversion device to obtain a finger point cloud $Cloud_{Finger}$, wherein the finger point cloud $Cloud_{Finger}$ at least comprises a curved nail surface point cloud $Cloud_{Nail\text{-}s}$ of the whole nail;

Step of point cloud correction: transforming the pose and position of the finger point cloud to a preset pose and position by a point cloud direction device;

Step of point cloud extraction: segmenting the finger point cloud by a segmentation growing device to obtain a curved nail surface point cloud in the finger point cloud;

Step of point cloud flattening: flattening the curved nail surface point cloud under the condition of equal surface area by a point cloud flattening device to obtain a planar nail surface point cloud;

Step of edge processing: extracting an input contour point cloud, representing a contour, from the planar nail surface point cloud output by the point cloud flattening device, and performing curve fitting on the input contour point cloud to obtain a smooth output contour point cloud, by an edge processing device.

FIG. 2

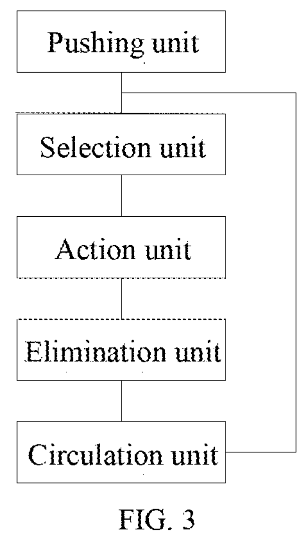

FIG. 3

S1: acquiring point cloud data output in the previous step, converting the acquired point cloud data into a point cloud list and outputting the point cloud list, by a point cloud acquisition module;

S2: stablishing an empty to-be-acted point list, performing, by a point cloud processing module, a cyclic action on points in the point cloud list, and obtaining a new point cloud list;

S21: acquiring the point cloud list output by the point cloud acquisition module and pushing all the points in the point cloud list into the empty to-be-acted point list, by a pushing unit, such that the point cloud list is emptied;

S22: selecting one point from the to-be-acted point list as a current to-be-acted point and searching for all neighboring points of the current to-be-acted point under a set condition, by a selection unit;

S23: selecting neighboring points meeting an action condition from the neighboring points, classifying the neighboring points to select a growing action or a flattening action and then pushing non-acted neighboring points meeting the action condition into the point cloud list and the to-be-acted point list, by an action unit;

S24: marking the current to-be-acted point as an acted point and eliminating the acted point from the to-be-acted point list, by an elimination unit;

S25: selecting another point from the to-be-acted point list as a new current to-be-acted point $P_{act}'$, and repeating S22-S24 by a circulation unit until the to-be-acted point list is emptied to obtain the new point cloud list.

FIG. 4

S1: acquiring a finger point cloud output by a data conversion device in the step of data conversion. converting the finger point cloud into a growing point cloud list and outputting the growing point cloud list, by a point cloud acquisition module S2: establishing an empty to-grow point list, extracting, by a point cloud extraction module, the growing point cloud list from the point cloud acquisition module, performing a cyclic action on points in the growing point cloud list, and obtaining a new growing point cloud list;

S21: acquiring the growing point cloud list output by the point cloud acquisition module and pushing all points in the growing point cloud list into the to-grow point list, by a pushing unit, such that the growing point cloud list is emptied;

S22: selecting one point from the to-grow point list as a current to-grow point and searching for all neighboring points of the current to-grow point under a set condition, by a selection unit;

S23: selecting neighboring points meeting an action condition from the neighboring points, classifying the neighboring points to select a growing action and pushing non-growing neighboring points meeting the action condition into the growing point cloud list and the to-grow point list, by a growing action unit;

S24: marking the current to-grow point as a grown point and eliminating the grown point from the to-grow point list, by an elimination unit;

S25: selecting another point from the to-grow point list as a new current to-grow point, and repeating S22-S24 by a circulation unit until the to-grow point list is emptied, such that the new growing point list representing a curved nail surface point cloud is obtained.

FIG. 6

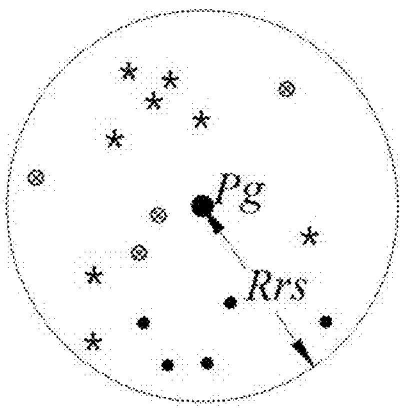

FIG. 7

NAIL SHAPE EXTRACTION SYSTEM AND METHOD, STORAGE MEDIUM, AND NAIL STICKER AND MANUFACTURING SYSTEM THEREFOR

BACKGROUND OF THE INVENTION

1. Technical Field

The application relates to the field of personalized nail tips, and more particularly relates to a nail shape extraction system and method, a storage medium, a nail tip, and a manufacturing system for the nail tip.

2. Description of Related Art

In recent years, people's pursuit of beautiful nails leads to the emergence on the market of simple nail beatifying products called nail tips. Nail tips, as finished nail stickers, can be adhered to nails directly with an adhesive layer. Compared with traditional nail polish, the nail tips are easy to use and low in prices and can be used anytime anywhere, thus becoming more and more popular to people who pursue fashion and beauty:

Generally, the shape of nail tips has been fixed in the factory, and for the sake of aesthetics, the outer contour of the nail tips typically has a perfect arc-shaped edge in the planar state. However, the fixed and perfect arc-shaped edge does not fit the actual contour of the nails of users, and cannot completely adapt to the shape of the nails of different users, so the nail tips may fail to completely cover the nails of users or exceed the nails of users.

An existing method for solving this problem is to extract the nail contour of users by means of image recognition. For example, Chinese Invention Patent Publication No. CN109770520A discloses a printing method for a nail art device, which records videos of the fingers of users or takes pictures of the fingers of the users by means of a camera device, and determines the position, shape and size of the nails of the users and recognizes the contour of the nails by means of a control module according to the videos or pictures of the fingers of the users obtained by means of the camera device.

However, data extracted by the printing method for a nail art device is 2D data of 2D images, and does not completely match the arc-shaped 3D nail shape, so the extracted nail contour is not identical with the actual nail contour.

To solve this technical problem, a novel nail contour extraction method for extracting arc-shaped 3D nail contours which better match the nail edges of users is urgently needed.

BRIEF SUMMARY OF THE INVENTION

In a first aspect, the application provides a nail shape extraction system based on point clouds, which comprises a cyclic processing device for processing point clouds, wherein the cyclic processing device comprises:

A point cloud acquisition module configured to acquire point cloud data, convert the acquired point cloud data into a point cloud list $\{R_{act}\}$, and output the point cloud list {Ruct}: and A point cloud processing module connected to the point cloud acquisition module, and configured to perform a cyclic action on points in the point cloud list $\{R_{act}\}$ output by the point cloud acquisition module to obtain a new point cloud list $\{R_{act}\}$;

The point cloud processing module comprises:

A pushing unit connected to the point cloud acquisition module, and configured to acquire the point cloud list $\{R_{act}\}$ output by the point cloud acquisition module and push all the points in the point cloud list $\{R_{act}\}$ into an empty to-be-acted point list $\{A_{act}\}$;

A selection unit connected to the pushing unit, and configured to select one point from the to-be-acted point list $\{A_{act}\}$ as a current to-be-acted point $P_{act}$ and search for all neighboring points $\{N_{act}\}$ of the current to-be-acted point $P_{act}$ under a set condition:

An action unit connected to the selection unit, and configured to select neighboring points $N_{act}(i)$ meeting an action condition from the neighboring points $\{N_{act}\}$, classify the neighboring points $N_{act}(i)$ to select a growing action or a flattening action and then push the neighboring points $N_{act}(i)$ meeting the action condition into the point cloud list {Ruct} and the to-be-acted point list $\{A_{act}\}$;

An elimination unit connected to the action unit, and configured to mark the current to-be-acted point $P_{act}$ as an acted point and eliminate the acted point from the to-be-acted point list $\{A_{act}\}$; and A circulation unit connected to the selection unit, the action unit and the elimination unit, and configured to promote the selection unit, the action unit and the elimination unit to act cyclically until the to-be-acted point list {Auct} is emptied to obtain the new point cloud list $\{R_{act}\}$.

Further, preferably, in the action unit, a normal vector angle $\theta_i$ between each non-acted neighboring point $N_{act}(i)$ among the neighboring points $\{N_{act}\}$ and the current to-be-acted point $P_{act}$ is calculated: if the normal vector angle $\theta_i$ between the non-acted neighboring point $N_{act}(i)$ and the current to-be-acted point $P_{act}$ is less than or equal to an angle threshold $\theta_{thres}$, the non-acted neighboring point $N_{act}(i)$ is marked as a to-be-further-acted point: otherwise, the non-acted neighboring point $N_{act}(i)$ is marked as a not-to-be-further-acted point:

A maximum area among areas with multiple continuous acted points and/or to-be-further-acted points is determined as a suitable action range $\{R_c\}$, and the to-be-further-acted points within the suitable action range $\{R_c\}$ are pushed into the point cloud list $\{R_{act}\}$ and the to-be-acted point list $\{A_{act}\}$.

Further, preferably, in the action unit, a space around the current to-be-acted point $P_{act}$ is equally divided into n areas with the current to-be-acted point $P_{act}$ as a central point, numbers of different types of neighboring points $N_{act}(i)$ in each area are compared to select to-be-acted candidate areas, and then the to-be-acted candidate area with a maximum angle is determined as the suitable action range $\{R_c\}$ around the current to-be-acted point $P_{act}$;

The to-be-acted candidate areas are selected according to the following condition:

Areas where to-be-further-acted points are more than other types of points are determined as to-be-further-acted areas, areas without point clouds and areas where not-to-be-further-acted points are more than other types of points are determined as not-to-be-acted areas, areas where acted points are more than other types of points are determined as acted areas, and adjacent to-be-further-acted areas and/or acted areas are integrated into the to-be-acted candidate areas: or Areas where the sum of the number of to-be-further-acted points and the number of acted points is not less than the number of not-to-be-further-acted points are determined as to-be-further-acted areas, areas without point clouds and areas where the sum of the number of to-be-further-acted points and the number of acted points is less than the number of not-to-be-further-acted points are determined as not-to-be-acted areas, and adjacent to-be-further-acted areas are integrated into the to-be-acted candidate areas: or Areas only comprising to-be-further-acted points and/or acted points are determined as to-be-further-acted areas, and areas without point clouds and areas comprising not-to-be-further-acted points are determined as not-to-be-acted areas, and adjacent to-be-further-acted areas are integrated into the to-be-acted candidate areas.

Further, preferably, in the action unit, each non-acted neighboring point $N_{act}(i)$ among the neighboring points $\{N_{act}\}$ is flattened to fall into a set plane, and then each flattened neighboring point $N_{act}(i)$ is pushed into the point cloud list $\{R_{act}\}$ and the to-be-acted point list $\{A_{act}\}$ and is taken as a new current to-be-acted point $P_{act}'$ in next time of flattening:

The set plane is parallel to a plane formed by point clouds, representing a contour, among to-be-flattened point clouds.

Further, preferably, in the action unit, the neighboring points $\{N_{act}\}$ of the current to-be-acted point $P_{act}$ are flattened by equal arc lengths or by projection.

Further, preferably, in the selection unit, the first selected current to-be-acted point $P_{act}$ falls within the set plane.

Further, preferably, in the selection unit, the selected neighboring points $\{N_{act}\}$ are all points within a set search radius $R_{rs}$, with the current to-be-acted point $P_{act}$ as a center: or In the selection unit, the selected neighboring points $\{N_{act}\}$ are a set number N of points closest to the current to-be-acted point $P_{act}$.

Further, preferably, the nail shape extraction system based on point clouds further comprises:

A point cloud correction device connected to the cyclic processing device, and configured to transform the pose and position of the point clouds to a preset pose and position, and transmit the transformed point clouds to the cyclic processing device:

Wherein, at the preset pose and position, the centroid of the point clouds coincides with an origin of a coordinate system in a point cloud library: a front end of a nail in the point cloud points to a forward direction of an x-axis of the coordinate system, a left side of the nail points to a forward direction of a y-axis of the coordinate system, and a back of the nail points to a negative direction of a z-axis of the coordinate system.

Further, preferably, the nail shape extraction system based on the point clouds further comprises:

An edge processing device connected to the cyclic processing device, and configured to perform edge processing on a point cloud data transmitted by the cyclic processing device to make an edge smooth.

In a second aspect, the application provides a nail shape extraction method based on point clouds, which is used for implementing the nail shape extraction system based on point clouds in any one of the above-mentioned technical solutions. Specifically, the nail shape extraction method based on point clouds comprises a step of cyclic processing of point clouds, wherein the step of cyclic processing of point clouds comprises:

S1: acquiring point cloud data, converting the acquired point cloud data into a point cloud list $\{R_{act}\}$ and outputting the point cloud list $\{R_{act}\}$, by a point cloud acquisition module: and S2: establishing an empty to-be-acted point list $\{A_{act}\}$, performing, by a point cloud processing module, a cyclic action on points in the point cloud list $\{R_{act}\}$ output by the point cloud acquisition module, and obtaining a new point cloud list $\{R_{act}'\}$; S2 comprises:

S21: acquiring the point cloud list $\{R_{act}\}$ output by the point cloud acquisition module and pushing all the points in the point cloud list $\{R_{act}\}$ into the empty to-be-acted point list $\{A_{act}\}$, by a pushing unit, such that the point cloud list {Ruct} is emptied:

S22: selecting one point from the to-be-acted point list $\{A_{act}\}$ as a current to-be-acted point $P_{act}$ and searching for all neighboring points $\{N_{act}\}$ of the current to-be-acted point $P_{act}$ under a set condition, by a selection unit:

S23: selecting neighboring points $N_{act}(i)$ meeting an action condition from the neighboring points $\{N_{act}\}$, classifying the neighboring points $N_{act}(i)$ to select a growing action or a flattening action and then pushing non-acted neighboring points $N_{act}(i)$ meeting the action condition into the point cloud list $\{R_{act}\}$ and the to-be-acted point list $\{A_{act}\}$, by an action unit:

S24: marking the current to-be-acted point $P_{act}$ as an acted point and eliminating the acted point from the to-be-acted point list $\{A_{act}\}$, by an elimination unit: and S25: selecting another point from the to-be-acted point list $\{A_{act}\}$ as a new current to-be-acted point $P_{act}'$, repeating S22-S24 by a circulation unit until the to-be-acted point list $\{A_{act}\}$ is emptied to obtain the new point cloud list $\{R_{act}'\}$.

In a third aspect, the application further provides a computer-readable storage medium having a computer program instruction stored therein, wherein when the computer program instruction is executed by a processor, the steps of the method mentioned above are performed.

In a fourth aspect, the application further provides a manufacturing system for a personalized nail tip, which comprises a nail shape extension sub-system, the nail shape extraction system based on point clouds in any one of the abovementioned technical solutions, a parameter generation sub-system, and a product processing sub-system, wherein the nail shape extension sub-system, the nail shape extraction system, the parameter generation sub-system and the product processing sub-system are connected in sequence:

The nail shape extension sub-system is configured to extract a 3D shape of a finger with a nail of a user, then measure 3D shape data of the finger, and transmit a measurement result to the nail shape extraction system:

The nail shape extraction system based on point clouds is configured to convert the 3D shape data of the finger output by the nail shape extension sub-system into a 3D point cloud, extract a curved nail point cloud from the 3D point cloud, flatten the curved nail point cloud into a planar point cloud, extract a nail point cloud representing a contour from the planar point cloud, and then transmit the nail point cloud representing the contour to the parameter generation sub-system in the form of 2D shape data:

The parameter generation sub-system is configured to combine the 2D shape data of the planar nail contour output by the nail shape extraction system based on point clouds and parameters of a personalized nail tip selected by a customer to generate a 2D digital model of the personalized nail tip, convert the generated 2D digital model into processing parameters, and transmit the processing parameters to the product processing sub-system:

The product processing sub-system is configured to process a to-be-processed material into the personalized nail tip according to the processing parameters output by the parameter generation sub-system.

In a fifth aspect, the application provides a nail tip, which is a personalized nail tip manufactured through the manufacturing system for a personalized nail tip.

Compared with the prior art, the invention has the following beneficial effects:

1. In the application, by adding the determination condition, neighboring points around the current to-be-acted point under a set condition are selected and determined, neighboring points meeting an action condition are selected, and an action is performed on the neighboring points meeting the action condition, such that the sensitivity of an angle threshold in the action process can be reduced, the action is accurate and effective and will not be performed excessively or insufficiently, and an extracted and flattened nail contour can better fit the nail contour of a target finger.

2. In the application, an action is performed on selected neighboring points meeting an action condition and will not be performed on acted points, such that the cycle number is reduced, and the running speed is increased.

3. In the application, points in a to-be-acted list are selected and acted continuously, then points meeting an action condition are pushed into a point cloud list and the to-be-acted list, and the steps of selection, action and pushing are repeated until the cyclic process ends, such that an obtained a new point cloud list is more accurate, the steps and difficulty of the process are reduced, the cycle number is further reduced, and the running speed is increased.

4. Points within a maximum range around the current to-be-acted point are determined as points meeting a growing condition, which is more in line with the clustering condition of the nail point, such that points of the nail point cloud can be selected more accurately and then pushed into a point cloud list.

5. Neighboring points, meeting a flattening condition, around the current to-be-acted point are determined, and are flattened to a set plane where the current to-be-acted point is located, errors between the planar surface of a planar nail surface point cloud obtained after flattening and the curved surface of a curved nail surface point cloud are reduced, and the obtained planar nail surface point cloud better fits the surface of a target nail.

BRIEF DESCRIPTION OF THE SEVERAL VIEWS OF THE DRAWINGS

FIG. 1 is a structural diagram of a nail shape extraction system based on point clouds according to Embodiment 1 of the application:

FIG. 2 is a flow diagram of the nail shape extraction system based on point clouds according to Embodiment 1 of the application:

FIG. 3 is a structural diagram of a cyclic processing device according to Embodiment 1 of the application:

FIG. 4 is a flow diagram of the step of cyclic processing according to Embodiment 1 of the application:

FIG. 6 is a flow diagram of the step of point cloud extraction according to Embodiment 2 of the application:

FIG. 7 is a schematic diagram of a current to-be-acted point and neighboring point within a search radius of the current to-be-acted point according to Embodiment 2 of the invention:

DETAILED DESCRIPTION OF THE INVENTION

Figure 5:
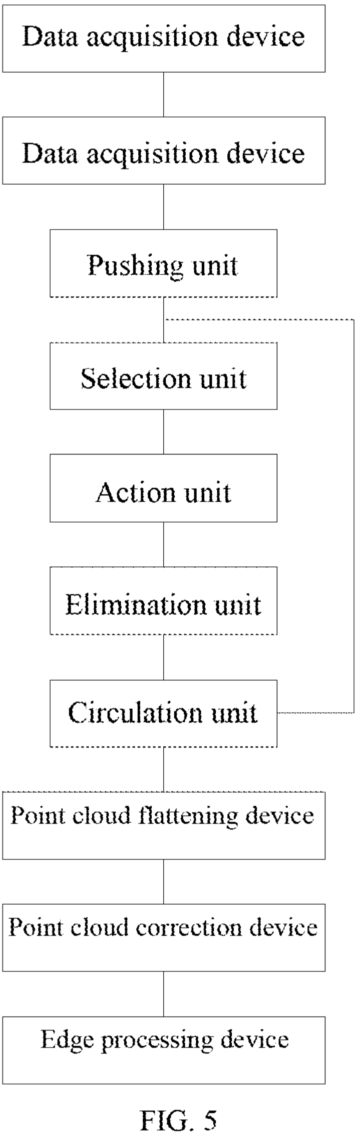
FIG. 5 is a structural diagram of a segmentation growing device according to Embodiment 2 of the application.

The technical solutions of the embodiments of the application will be described below in conjunction with the accompanying drawings.

It should be understood that specific examples in this specification are merely used to help those skilled in the art have a better understanding of the embodiments of the application, and are not intended to limit the scope of the embodiments of the application.

It should also be understood that the serial numbers of processes in the embodiments of the application do not indicate the execution order of the processes, the execution order the processes should be determined by function and internal logic, and the serial numbers should not be construed any limitations of the implementation process of the embodiments of the application.

It should also be noted that various embodiments described in this specification may be implemented separately or in combination, and the application has not limitation in this aspect.

Unless otherwise stated, all technical and scientific terms used in the embodiments of the application have the same meaning as commonly understood by those skilled in the art. The terms used in the application are merely used for describing specific embodiments and are not intended to limit the scope of the application. The term "and/or" used in the application indicates the inclusion of any and all possible combinations of one or more relevant items listed.

EMBODIMENT 1

Embodiment 1 of the application provides a nail shape extraction system based on point clouds, which is used for extracting a planar shape fitting the curved surface of a nail, and customizing a personalized nail tip fitting the nail shape of users. Specifically, as shown in FIG. 1, the nail shape extraction system based on point clouds comprises a data acquisition device used for collecting and acquiring finger 3D data $Data_{Finger}$ of a user, a data conversion device used for converting the finger 3D data $Data_{Finger}$ into a finger point cloud $Cloud_{Finger}$, a segmentation growing device used for extracting a curved nail surface point cloud $Cloud_{Nail-s}$ from the finger point cloud $Cloud_{Finger}$, and a point cloud flattening device used for flattening the curved nail surface point cloud $Cloud_{Nail-s}$ to obtain a planar nail surface point cloud $Cloud_{Nail-p}$, wherein the data acquisition device, the data conversion device, the segmentation growing device and the point cloud flattening device are connected in sequence.

According to the nail shape extraction system based on point clouds provided by Embodiment 1, Embodiment 1 of the application also provides a nail shape extraction method based on point clouds, which as shown in FIG. 2 comprises:

A step of data acquisition: performing 3D scanning on a target finger by the data acquisition device to obtain finger 3D data $Data_{Finger}$ of the target finger, wherein the finger 3D data $Data_{Finger}$ at least comprises nail 3D data $Data_{Nail}$ of a whole nail;

A step of data conversion: converting the finger 3D data $Data_{Finger}$ into 3D point cloud data by the data conversion device to obtain a finger point cloud $Cloud_{Finger}$, wherein the finger point cloud $Cloud_{Finger}$ at least comprises a curved nail surface point cloud $Cloud_{Nail-s}$ of the whole nail:

A step of point cloud extraction: segmenting the finger point cloud $Cloud_{Finger}$ by the segmentation growing device to obtain the curved nail surface point cloud $Cloud_{Nail-s}$ in the finger point cloud $Cloud_{Finger}$: and A step of point cloud flattening: flattening the curved nail surface point cloud $Cloud_{Nail-s}$ under the condition of equal surface area by the point cloud flattening device to obtain a planar nail surface point cloud $Cloud_{Nail-p}$.

In the nail shape extraction system and method based on point clouds, the data acquisition device can be a laser radar, a depth camera or can be a 3D scanner, a structured light camera and a binocular camera which made mainly of a laser radar or a depth camera, or the like. For example, in the step of data acquisition, the data acquisition device performs 3D scanning on the target finger by means of the laser radar based on the triangulation ranging principle or performs 3D scanning on the target finger by means of the depth camera based on the structured light ranging principle, the binocular vision ranging principle and the TOF ranging principle, such that the finger 3D data $Data_{Finger}$ can be obtained quickly and accurately.

All the 3D scanning ranging principles mentioned above such as the triangulation ranging principle, the TOF ranging principle, the structured light ranging principle and the binocular vision ranging principle are existing technique and are widely used in daily life, and thus will not be detailed here.

In the nail shape extraction system and method based on point clouds, the data conversion device receives the finger 3D data $Data_{Finger}$ collected and sent by the data acquisition device, and then converts the finger 3D data $Data_{Finger}$ into 3D point cloud data to obtain the finger point cloud $Cloud_{Finger}$. Specifically, the data conversion device converts the finger 3D data $Data_{Finger}$ into PLC data or data in other formats supported by a point cloud library, such as the ped format and the ply format, the specific format is determined according to the format of data acquired by the data acquisition device and the data format supported by the segmentation growing device and the point cloud flattening device. Because the finger 3D data $Data_{Finger}$ at least comprises the nail 3D data DataNanl of the nail and skin 3D data $Data_{skin}$ of skin around the nail, the finger point cloud $Cloud_{Finger}$ in the pcd format or other data formats supported by the point cloud library converted from the finger 3D data $Data_{Finger}$ at least comprises the curved nail surface point cloud $Cloud_{Nail-s}$ of the nail with an uneven and curved surface and a skin point cloud $Cloud_{skin}$ of the skin around the nail.

Of course, in other examples of Embodiment 1, if the data acquisition device has a data conversion function, the data acquisition device can also serve as the data conversion device to directly convert the data format of the finger 3D data $Data_{Finger}$ into the pcd format to obtain the finger point cloud $Cloud_{Finger}$, in the step of data conversion.

In Embodiment 1, a determination condition for determining whether an action needs to be performed on the point cloud is added in the step of point cloud extraction and/or point cloud flattening, that is, when the curved nail surface point cloud $Cloud_{Nail-s}$ is extracted and/or when the curved nail surface point cloud $Cloud_{Nail-s}$ is flattened, a current to-be-acted point Puct and all neighboring points $\{N_{act}\}$ around the current to-be-acted point Puct are selected, then neighboring points $N_{act}(i)$, meeting the action condition, among all the neighboring points $\{N_{act}\}$ are determined, and then a corresponding action is performed on the neighboring points $N_{act}(i)$ meeting the action condition, such that the action can be performed on the neighboring points $\{N_{act}\}$ around the current to-be-acted point $P_{act}$ more accurately and will not be performed excessively or insufficiently, the cycle number is reduced, and the running speed is increased.

In the presence of the determination condition, as shown in FIG. 3, the segmentation growing device and/or the point cloud flattening device is a cyclic processing device, which comprises a point cloud acquisition module and a point cloud processing module, wherein the point cloud processing module has an initially empty to-be-acted point list $\{A_{act}\}$ which is used in the subsequent point cloud processing process; the point cloud acquisition module is used for acquiring point cloud data obtained in the previous step, presenting the point cloud data in the form of a point cloud list $\{R_{act}\}$, and then transmitting the point cloud list $\{R_{act}\}$ to the point cloud processing module: and the point cloud processing module receives the point cloud list $\{R_{act}\}$ transmitted from the point cloud acquisition module, and then preforms segmentation growing on the finger point cloud $Cloud_{Finger}$ to extract the curved nail surface point cloud $Cloud_{Nail-s}$ or flattens the curved nail surface point cloud $Cloud_{Nail-s}$ to obtain the planar nail point cloud $Cloud_{Nail-p}$.

The point cloud processing module of the cyclic processing device comprises a pushing unit, a selection unit, an action unit, an elimination unit and a circulation unit. Wherein, an input terminal of the pushing unit is connected to an output terminal of the point cloud acquisition module, an output terminal of the pushing unit is connected to the selection unit, the selection unit, the action unit, the elimination unit and the circulation unit are connected cyclically, and an output terminal of the circulation unit is connected to the input terminal of the device in the next step.

Specifically, the pushing unit has the input terminal connected to the output terminal of the point cloud acquisition module, and is configured to acquire the point cloud list $\{R_{act}\}$ output by the point cloud acquisition module and push all points in the point cloud list $\{R_{act}\}$ into the empty to-be-acted point list $\{A_{act}\}$, such that the point cloud list $\{R_{act}\}$ is emptied.

The selection unit has an input terminal connected to the output terminal of the pushing unit, and is configured to select one point from the to-be-acted point list $\{A_{act}\}$ output by the pushing unit as a current to-be-acted point $P_{act}$ and search for all neighboring points $\{N_{act}\}$ of the current to-be-acted point $P_{act}$ under a set condition.

The action unit has an input terminal connected to the output terminal of the selection unit, and is configured to select neighboring points $N_{act}(i)$ meeting an action condition from all the neighboring points $\{N_{act}\}$, classify the neighboring points $N_{act}(i)$ to select a growing action or a flattening action and then push the neighboring points $N_{act}(i)$ meeting the action condition into the point cloud list $\{R_{act}\}$ and the to-be-acted point list $\{A_{act}\}$.

The elimination unit has an input terminal connected to an output terminal of the action unit, and is configured to mark the current to-be-acted point $P_{act}$ output by the action unit as an acted point and eliminate the acted point from the to-be-acted point list $\{A_{act}\}$.

The circulation unit has an input terminal connected to an output terminal of the elimination unit and an output terminal connected to the input terminal of the selection unit, and is configured to promote the selection unit, the action unit and the elimination unit to act cyclically to form a selection unit-action unit-elimination unit-circulation unit-selection unit cyclic connection structure until the to-be-acted point list $\{A_{act}\}$ is emptied, to obtain a new point cloud list $\{R_{act}\}$.

Based on the segmentation growing device and/or the point cloud flattening device in the nail shape extraction system based on point clouds provided by Embodiment 1, the step of point cloud extraction and/or point cloud flattening in the nail shape extraction method based on point clouds provided by Embodiment 1 is a step of cyclic processing, which as shown in FIG. 4 specifically comprises:

S1: acquiring the point cloud data output in the previous step, converting the acquired point cloud data into a point cloud list $\{R_{act}\}$ and outputting the point cloud list {Ruct}, by the point cloud acquisition module; and S2: establishing an empty to-be-acted point list $\{A_{act}\}$, acquiring, by the point cloud processing module, the point cloud list $\{R_{act}\}$ output by the point cloud acquisition module, and then performing a cyclic action on points in the point cloud list $\{R_{act}\}$, and obtaining a new point cloud list $\{R_{act}'\}$.

S2 specifically comprises:

S21: acquiring the point cloud list $\{R_{act}\}$ output by the point cloud acquisition module and pushing all points in the point cloud list $\{R_{act}\}$ into a to-be-acted point list $\{A_{act}\}$, by the pushing unit, such that the point cloud list $\{R_{act}\}$ is emptied:

S22: selecting one point from the to-be-acted point list $\{A_{act}\}$ as a current to-be-acted point $P_{act}$ and searching for all neighboring points $\{N_{act}\}$ of the current to-be-acted point $P_{act}$ under a set condition, by the selection unit:

S23: selecting neighboring points $N_{act}(i)$ meeting an action condition from all the neighboring points $\{N_{act}\}$, classifying the neighboring points $N_{act}(i)$ to select a growing action or a flattening action and then pushing non-acted neighboring points $N_{act}(i)$ meeting the action condition into the point cloud list $\{R_{act}\}$ and the to-be-acted point list $\{A_{act}\}$, by the action unit:

S24: marking the current to-be-acted point $P_{act}$ as an acted point and eliminating the acted point from the to-be-acted point list $\{A_{act}\}$, by the elimination unit: and S25: selecting another point from the to-be-acted point list $\{A_{act}\}$ as a new current to-be-acted point $P_{act}'$, and repeating S22-S24 by the circulation unit until the to-be-acted point list $\{A_{act}\}$ is emptied, such that the new point cloud list $\{R_{act}'\}$ is obtained.

Compared with the prior art, the nail shape extraction system and method based on point clouds in Embodiment I have the following advantages: by adding the determination condition, the neighboring points $\{N_{act}\}$ around the current to-be-acted point $P_{act}$ under the set condition are selected and determined, an action is accuracy performed on the neighboring points $N_{act}(i)$ meeting the action condition according to determination results, such that the sensitivity of an angle threshold $\theta_{thres}$ in the action process can be reduced, the action is accurate and effective and will not be performed excessively or insufficiently, repeated action of acted points is avoided, the cycle number is reduced, and the running speed is increased.

All points in the to-be-acted point list $\{A_{act}\}$ are in the form of a set, $\{A_{act}\}=\{A_1, A_2, A_3 \ldots\}$. In some examples of Embodiment 1, points in the to-be-acted point list $\{A_{act}\}$ are selected as to-be-acted points randomly. In some other examples, points in the to-be-acted point list $\{A_{act}\}$ are selected as to-be-acted points regularly. For example, in S22 of the application, the frontmost point in the to-be-acted point list $\{A_{act}\}$ is selected as the current to-be-acted point $P_{act}$ by the selection unit, and the frontmost point in the to-be-acted point list $\{A_{act}\}$ is the first point in the point cloud set $\{A_1, A_2, A_3 \ldots\}$, which is $A_1$. In this way, the step of selecting the current to-be-acted point $P_{act}$ is simplified, the selection method is optimized, the calculation steps are reduced, and the running speed is increased.

In S22, all neighboring points $\{N_{act}\}$ around the current to-be-acted point $P_{act}$ under the set condition are selected by the selection unit generally through two methods: first, with the current to-be-acted point $P_{act}$ as the center, all points within a set search radius $R_{rs}$ are taken as the neighboring points $\{N_{act}\}$: second, with the current point as an origin, a set number N of points closest to the current to-be-acted point $P_{act}$ are taken as the neighboring points $\{N_{act}\}$. The search radius $R_{rs}$ or the set number N is selected as actually needed, such that an action can be accurately performed on the neighboring points $\{N_{act}\}$ meeting the action condition around the current to-be-acted point $P_{act}$ with a small number of cycles.

In some examples, when the neighboring points $\{N_{act}\}$ within the search radius $R_{rs}$ around the current to-be-acted point $P_{act}$ are selected, a means distance $\bar{d}$ between all points in the to-be-acted point list $\{A_{act}\}$ is calculated first, and the search radius $R_{rs}$ is set to be 1.1-3 times of the means distance $\bar{d}$, more preferably 1.5-2 times of the means distance $\bar{d}$.

In some examples, when the set number N of neighboring points $\{N_{act}\}$ closest to the current to-be-acted point $P_{act}$ are selected, the set number N is 4-30, more preferably 10-15.

In Embodiment 1, the selection of neighboring points within the set range and the selection of the set number of neighboring point can be realized by a kd-tree or Octree.

k-d tree (k-dimensional tree) is a tree-form data structure where instance nodes in a k-dimensional space are stored to realize quick search of the instance nodes, and is mainly used for searching for key data in a multi-dimensional space, such as range search and nearest neighbor search.

Octree is a tree-form data structure for describing a three-dimensional space, each node of the Octree represents a volume element of a cube and comprises eight sub-nodes, and the sum of the volume elements of the eight sub-nodes is equal to the volume of a father node. In specific use, Octree searches for the neighboring points $\{N_{act}\}$ by binary search.

No matter whether k-d tree or Octree is used, all the neighboring points $\{N_{act}\}$ around the current to-be-acted point $P_{act}$ under the set condition can be searched out quickly and accurately.

As shown in FIG. 1 and FIG. 2, in some examples of Embodiment 1, the nail shape extraction system based on point clouds further comprises a point cloud correction device, which is arranged between the data conversion device and the segmentation growing device, and is configured to receive the finger point cloud $Cloud_{Finger}$ transmitted from the data conversion device, transform the pose and position of the finger point cloud $Cloud_{Finger}$ to a preset pose and position, and then transmit the transformed finger point cloud $Cloud_{Finger}$ to the point cloud acquisition module before the nail surface cloud point $Cloud_{Nail\text{-}s}$ is extracted from the finger point cloud $Cloud_{Finger}$. In this way, the position of the finger point cloud $Cloud_{Finger}$ is corrected before point cloud segmentation to facilitate processing and calculation, the processing process is simplified, and the running speed is increased.

Corresponding to the point cloud correction device, the nail shape extraction method based on point clouds provided by Embodiment I further comprise the following step between the step of data conversion and the step of point cloud extraction:

A step of point cloud correction: transforming the pose and position of the output finger point cloud $Cloud_{Finger}$ to a preset pose and position by the point cloud direction device.

It should be noted that the at the preset pose and position, the centroid of the output finger point cloud $Cloud_{Finger}$, coincides with an origin of a coordinate system in the point cloud library, a front end of the finger points to a forward direction of an x-axis of the coordinate system, a left side of the finger in the width direction points to a forward direction of a y-axis of the coordinate system, and a back of the finger points to a negative direction of a z-axis of the coordinate system.

More specifically, the front end of the finger is an end, close to the nail growing end, of the finger and points to the growing direction of the nail, the left side of the finger in the width direction is a left side in the growing direction of the nail, and the back of the finger is a side, where the nail grows, of the finger, and points to the finger pulp.

The point cloud correction device corrects the pose and position of the point cloud through many methods such as rotation matrix, quaternion and Euler angle.

In some other examples of Embodiment 1, the point cloud correction device is arranged between the segmentation growing device and the point cloud flattening device, and is configured to receive the curved nail surface point cloud CloudNuls transmitted from the segmentation growing device and transform the pose and position of the curved nail surface point cloud $Cloud_{Nail-s}$ to a preset pose and position before the curved nail surface point cloud $Cloud_{Nail-s}$ is flattened.

As shown in FIG. 1, in some other examples of Embodiment 1, the nail shape extraction system based on point clouds further comprises an edge processing device (cyclic processing device), wherein an input terminal of the edge processing device is connected to an output terminal of the segmentation growing device and/or the point cloud flattening device. The edge processing device is configured to perform edge processing on the curved nail surface point cloud $Cloud_{Nail-s}$ output by the segmentation growing device and/or the planar nail surface point cloud $Cloud_{Nail-p}$ output by the point cloud flattening device to make the edge of the curved nail surface point cloud $Cloud_{Nail-s}$ and/or the edge of the planar nail surface point cloud $Cloud_{Nail-p}$ smooth.

Corresponding to the edge processing device, the nail shape extraction method based on the point cloud provided by Embodiment I further comprises, as shown in FIG. 2, the following step after the step of point cloud flattening:

A step of edge processing: extracting an input contour point cloud $Cloud_{contour-i}$, representing a contour, from the planar nail surface point cloud $Cloud_{Nail-p}$ output by the point cloud flattening device, and performing curve fitting on the input contour point cloud to obtain a smooth output contour point cloud $Cloud_{Contour-o}$, by the edge processing device.

A smooth nail curve is obtained by performing curve fitting on the flattened planar nail surface point cloud $Cloud_{Nail-p}$, and the nail curve eliminates obvious unmatched point clouds or makes up for points failing to grow on the premise of conforming to the edge contour of the nail, such that the nail contour extraction accuracy is improved, the aesthetics of a nail contour draw according to the nail curve is improved, and thus, the fitness and aesthetics of a nail tip model made according to the nail contour and a nail tip produced through the nail tip model are improved.

Of course, in some other examples of Embodiment 2, the input terminal of the edge processing device is connected to the output terminal of the segmentation growing device, and the edge processing device is configured to perform edge processing on the curved nail surface point cloud $Cloud_{Nail-s}$ output by the segmentation growing device to make the edge of the curved nail surface point cloud $Cloud_{Nail-s}$ smooth.

On this basis, the step of edge processing performed after the step of point cloud extraction specifically comprises:

Extracting an input contour point cloud $Cloud_{Contour-i}$, representing a contour, from the curved nail surface point cloud $Cloud_{Nail-s}$ output by the segmentation growing device, and performing curve fitting on the input contour point cloud to obtain a smooth output contour point cloud $Cloud_{Contour-o}$, by the edge processing device.

Of course, in some other examples of the nail shape extraction method based on point clouds in Embodiment 1, the step of edge processing is performed both after the step of point cloud extraction and after the step of point cloud flattening to perform curve fitting on the input contour point cloud $Cloud_{Contour-i}$, representing the contour, extracted from the curved nail surface point cloud $Cloud_{Nail-s}$ and the input contour point cloud $Cloud_{Contour-i}$, representing the contour, extracted from the planar nail surface point cloud $Cloud_{Nail-p}$ respectively to obtain smooth output contour point clouds $Cloud_{Contour-o}$. In this way, the nail contour extraction accuracy can be further improved, the aesthetics of the nail contour draw according to the nail curves is improved, and thus, the fitness and aesthetics of a nail tip model made according to the nail contour and a nail tip produced through the nail tip model are improved. The smooth contour can facilitate the production and cutting of nail tips and lower the production difficulty.

On the basis of the nail shape extraction method based on point clouds, Embodiment 1 of the application further provides a computer-readable storage medium having a computer program instruction stored therein, and when the computer program instruction is executed by a processor, the steps of the nail shape extraction method based on point clouds in Embodiment 1 are performed.

EMBODIMENT 2

Embodiment 2 of the application provides a nail shape extraction system based on point clouds, which is designed and implemented based on the nail shape extraction system based on point clouds in Embodiment 1. The actual process or structure of the nail shape extraction system based on point clouds in this embodiment is similar to that of the nail shape extraction system based on point clouds in Embodiment 1, and also has some difference from that of the nail shape extraction system based on point clouds in Embodiment 1, and these differences will be described below: Other details that are not described below should be considered as the same as those in Embodiment 1, and will not be repeated anymore.

In Embodiment 2, as shown in FIG. 5, the nail shape extraction system and method are described in detail in the presence of the determination condition added in the step of point cloud extraction. Specifically, in Embodiment 2, the segmentation growing device of the nail shape extraction system comprises a point cloud acquisition module and a point cloud extraction module which are connected to each other, wherein the point cloud acquisition module is connected to the data conversion device, and is configured to acquire the finger point cloud $Cloud_{Finger}$ transmitted from the data conversion device and convert the finger point cloud $Cloud_{Finger}$ into a growing point cloud list $\{R_g\}$, and the point cloud extraction module is configured to receive the growing point cloud list $\{R_g\}$ transmitted from the point cloud acquisition module, establish an empty to-grow point list $\{A_g\}$, and then perform a segmentation growing action on the point cloud to extract the curved nail surface point cloud $Cloud_{Nail-s}$.

The point cloud extraction module comprises a pushing unit, a selection unit, a growing action unit, an elimination unit and a circulation unit. Wherein, an input terminal of the pushing unit is connected to an output terminal of the point cloud acquisition module, an output terminal of the pushing unit is connected to the selection unit, the selection unit, the growing action unit, the elimination unit and the circulation unit are connected cyclically, and an output terminal of the circulation unit is connected to an input terminal of the device in the step of point cloud flattening.

As shown in FIG. 6, the step of point cloud extraction of the nail shape extraction method using the segmentation growing device specifically comprises:

S1: acquiring the finger point cloud $Cloud_{Finger}$ output by the data conversion device, converting the finger point cloud $Cloud_{Finger}$ into a growing point cloud list $\{R_g\}$ and outputting the growing point cloud list $\{R_g\}$, by the point cloud acquisition module; and S2: establishing an empty to-grow point list $\{A_g\}$, extracting, by the point cloud extraction module, the growing point cloud list $\{R_g\}$ from the point cloud acquisition module, performing the following action on points in the growing point cloud list $\{R_g\}$, and obtaining a new growing point cloud list $\{R_g'\}$;

S21: acquiring the growing point cloud list $\{R_g\}$ output by the point cloud acquisition module and pushing all points in the growing point cloud list $\{R_g\}$ into the to-grow point list $\{A_g\}$, by the pushing unit, such that the growing point cloud list $\{R_g\}$ is emptied:

S22: selecting one point from the to-grow point list $\{A_g\}$ as a current to-grow point $P_g$ and searching for all neighboring points $\{N_g\}$ of the current to-grow point $P_g$ under a set condition, by the selection unit:

S23: selecting neighboring points $N_g(i)$ meeting an action condition from the neighboring points $\{N_g\}$, classifying the neighboring points $N_g(i)$ to select a growing action and pushing non-growing neighboring points $N_g(i)$ meeting the action condition into the growing point cloud list $\{R_g\}$ and the to-grow point list $\{A_g\}$, by the growing action unit:

S24: marking the current to-grow point $P_g$ as a grown point and eliminating the grown point from the to-grow point list $\{A_g\}$, by the elimination unit: and S25: selecting another point from the to-grow point list $\{A_g\}$ as a new current to-grow point $P_g'$, and repeating S22-S24 by the circulation unit until the to-grow point list $\{A_g\}$ is emptied, such that the new growing point list $\{R_g'\}$ representing the curved nail surface point cloud $Cloud_{Nail-s}$ is obtained.

S23 specifically comprises: in the growing action unit, calculating a normal vector angle $\theta_i$ between each non-growing neighboring point $N_g(i)$ among all the neighboring points $\{N_g\}$ and the current to-grow point $P_g$; if the normal vector angle $\theta_i$ between the non-growing neighboring point $N_g(i)$ and the current to-grow point $P_g$ is less than or equal to an angle threshold $\theta_{thres}$, marking the non-growing neighboring point $N_g(i)$ as a further-to-grow point: or if the normal vector angle $\theta_i$ between the non-growing neighboring point $N_g(i)$ and the current to-grow point $P_g$ is greater than the angle threshold $\theta_{thres}$, marking the non-growing neighboring point $N_g(i)$ as a not-to-grow point.

A determination condition is added in the point cloud segmentation growing process, a maximum area among areas with multiple continuous grown points and/or further-to-grow points is determined as a suitable growing range, and all further-to-grow points in the suitable growing range are pushed into the growing point cloud list $\{R_g\}$ and the to-grow point list $\{A_g\}$.

If the set angle threshold $\theta_{thres}$ is too large, the nail point cloud will grow excessively, and the extracted curved nail surface point cloud $Cloud_{Nail-s}$ will be too large. If the set angle threshold $\theta_{thres}$ is too small, the nail point cloud will fail to grow, and the extracted curved nail surface point cloud $Cloud_{Nail-s}$ will be too small, the cycle number will be increased, and the running speed will be decreased.

Compared with the prior art, the nail shape extraction system and method based on point clouds in Embodiment 3 can accurately extract the curved nail surface point cloud $Cloud_{Nail-s}$ from the finger point cloud $Cloud_{Finger}$, and by adding the growing determination condition, the sensitivity of the angle threshold $\theta_{thres}$ can be reduced, and excessive growth or failure to grow of the point cloud is reduced, thus obtaining a more accurate calculation and segmentation result. Moreover, under the growing determination condition added in Embodiment 2, no action is performed on growing points, such that the cycle number is reduced, the running time is shortened, and the running speed is increased.

From the aspect of algorithm flow, the specific process of the step of point cloud extraction is as follows:

Input:
- Input the finger point cloud $Cloud_{Finger}$
- Input the current to-grow point $P_g$
- Input the plane normal vector $\{N_p\}$
- Input the search radius $R_{rs}$
- Input the angle threshold $\theta_{thre}$ Output:
- Output the growing point cloud list $\{R_g\}$ Initialize:
- Initialize the growing point cloud list $\{R_g\}$
- Initialize the to-grow point cloud list, push all the points in the growing point cloud list $\{R_g\}$ into the to-grow point cloud list $\{A_g\}$ to empty the growing point cloud list $\{R_g\}$, $\{A_g\}\leftarrow\{R_g\}$
- Calculate the plane normal vector $\{N_p\}$ of input point clouds
- Algorithm loop:
- As long as the to-grow point list $\{A_g\}$ is not empty,
  - Select one point from the to-grow point cloud list $\{A_g\}$ as the current to-grow point $P_g$
  - Quickly search out all neighboring points $\{N_g\}$ of the current to-grow point $P_g$ within the search radius $R_{rs}$ by k-d tree
  - For each non-growing neighboring point $N_g(i)$ among all the neighboring points $\{N_g\}$, calculate:
- the normal vector angle $\theta_i$ between the current neighboring point $N_g(i)$ and the current to-grow point $P_g$; if $\theta_i$ is less than or equal to the angle threshold $\theta_{thres}$, that is, $\theta_i \le \theta_{thres}$, mark $N_g(i)$ as a further-to-grow point: otherwise, mark the $N_g(i)$ as a not-to-grow point For each $N_g(i)$ among all the all the neighboring points $\{N_g\}$, calculate a relative direction between the current neighboring point $N_g(i)$ and the current to-grow point $P_g$;

Calculate the suitable growing range $\{R_c\}$ around the current to-grow point $P_g$ based on the above data Traverse all further-to-grow neighboring points $N_g(i)$, within the suitable growing range $\{R_c\}$, around the current to-grow point $P_g$, that is, $N_g(i) \in \{R_c\}$, add the neighboring points $N_g(i)$ meeting the condition to the growing point cloud list $\{R_g\}$ and the to-grow point list $\{A_g\}$, $\{R_g\} \leftarrow \{R_g\} \cup N_g(i)$ $\{A_g\} \leftarrow \{A_g\} \cup N_g(i)$ Mark the current to-grow point $P_g$ as a grown point, and eliminate the current to-grow point $P_g$ from the to-grow point list $\{A_g\}$, $\{A_g\} \leftarrow \{A_g\} \backslash P_g$ Select another point from the to-grow point list $\{A_g\}$ as a new current to-grow point $P_g'$, repeat the above process until the to-grow point list $\{A_g\}$ is emptied, and output a new growing point list $\{R_g'\}$ representing the curved nail point cloud $Cloud_{Nail-s}$ In the growing action unit and S23, with the current to-grow point $P_g$ as a central point, the space around the current to-grow point $P_g$ is equally divided into n areas, the numbers of different types of neighboring points in the areas are compared to select to-grow candidate areas, and then the to-grow candidate area with the maximum angle is determined as the suitable growing range $\{R_c\}$ around the current to-grow point $P_g$. Herein, the value of n is 4-30, preferably 10-15.

In Embodiment 2, as shown in FIG. 7, the space around the current to-grow point $P_g$ is equally divided into 12 areas for calculation by way of an example. Specifically, in Embodiment 2, all neighboring points $\{N_g\}$ within the search radius $R_{rs}$, which is 1.5 times of $\bar{d}$, are searched out, and the search range is equally divided into 12 sectors with the current to-grow point $P_g$ as the center. In this way, the current to-grow point $P_g$ and all the neighboring points $\{N_g\}$ of the current to-grow point $P_g$ under the set condition are obtained, as shown in FIG. 7 where "·" represents grown points, "*" represents further-to-grow point, and "⊗" represent not-to-grow points.

In different examples of Embodiment 2, the largest to-grow candidate area within the range can be selected through different methods.

Figure 7A:
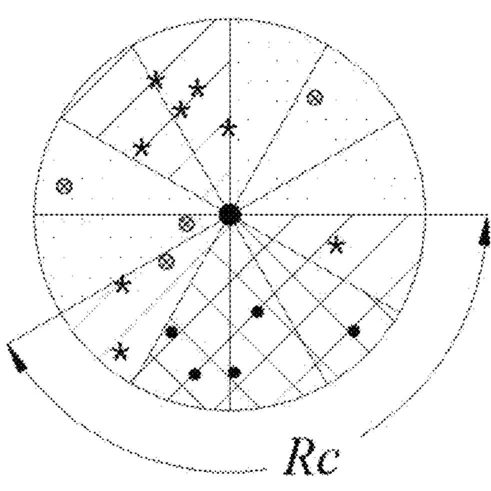
FIG. 7*a* is a schematic diagram of a suitable growing range obtained through a first method according to Embodiment 2 of the application.

First method: in some examples, as shown in FIG. 7*a*, areas where further-to-grow points are more than other types of points are determined as further-to-grow areas, areas without point clouds and areas where not-to-grow points are more than other types of points are determined as not-to-grow areas, areas where grown points are more than other types of points are determined as grown areas, and adjacent to-be-grow areas and/or grown areas are integrated into the to-grow candidate areas. The non-adjacent to-grow candidate areas are compared, and the to-grow candidate area with the maximum angle is selected as the suitable growing range $\{R_c\}$ around the current to-grow point $P_g$.

Figure 7B:
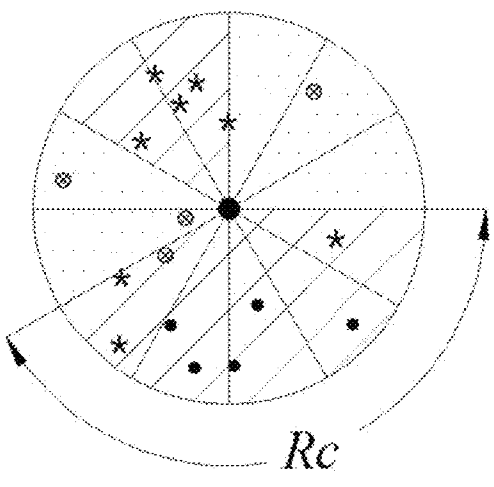
FIG. 7*b* is a schematic diagram of a suitable growing range obtained through a second method according to Embodiment 2 of the application.

Second method: in some examples, as shown in FIG. 7*b*, areas where the sum of the number of further-to-grow points and the number of grown points is not less than the number of not-to-grow points are determined as further-two-grow areas, areas without point clouds and areas where the sum of the number of further-to-grow points and the number of grown points is less than the number of not-to-grow points are determined as not-to-grow areas, and adjacent further-to-grow areas are integrated into the to-grow candidate areas. The non-adjacent to-grow candidate areas are compared, and the to-grow candidate area with the maximum angle is selected as the suitable growing range $\{R_c\}$ around the current to-grow point $P_g$.

Figure 7C:
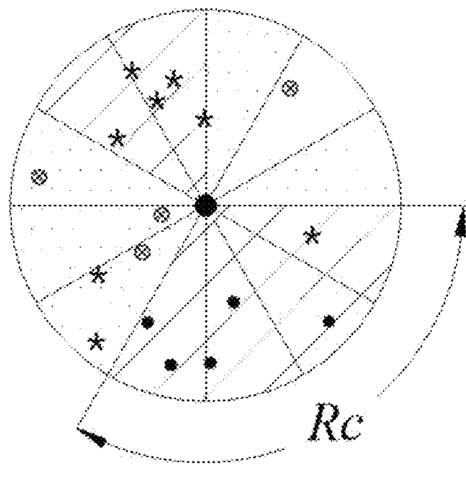
FIG. 7*c* is a schematic diagram of a suitable growing range obtained through a third method according to Embodiment 2 of the application.

Third method: in some examples, as shown in FIG. 7*c*, areas only comprising further-to-grow points and/or grown points are determined as further-to-grow areas, and areas without point clouds and areas comprising not-to-grow points are determined as not-to-grow areas, and adjacent further-to-grow areas are integrated into the to-grow candidate areas. The non-adjacent to-grow candidate areas are compared, and the to-grow candidate area with the maximum angle is selected as the suitable growing range $\{R_c\}$ around the current to-grow point $P_g$.

As can be seen, all the three methods can obtain the suitable growing range $\{R_c\}$; although the suitable growing ranges $\{R_c\}$ obtained through the three methods may be slightly different, and points within these ranges can be corrected continuously in the cyclic growing process of the corresponding neighboring points $N_g(i)$ pushed into the to-grow point list $\{A_g\}$.

EMBODIMENT 3

Embodiment 3 of the application provides a nail shape extraction system based on point clouds, which is designed and implemented based on the nail shape extraction system based on point clouds in Embodiment 1 or 2. The actual process or structure of the nail shape extraction system based on point clouds in this embodiment is similar to that of the nail shape extraction system based on point clouds in Embodiment 1 or 2, and also has some difference from that of the nail shape extraction system based on point clouds in Embodiment 1 or 2, and these differences will be described below: Other details that are not described below should be considered as the same as those in Embodiment 1 and 2, and will not be repeated anymore.

Figure 8:
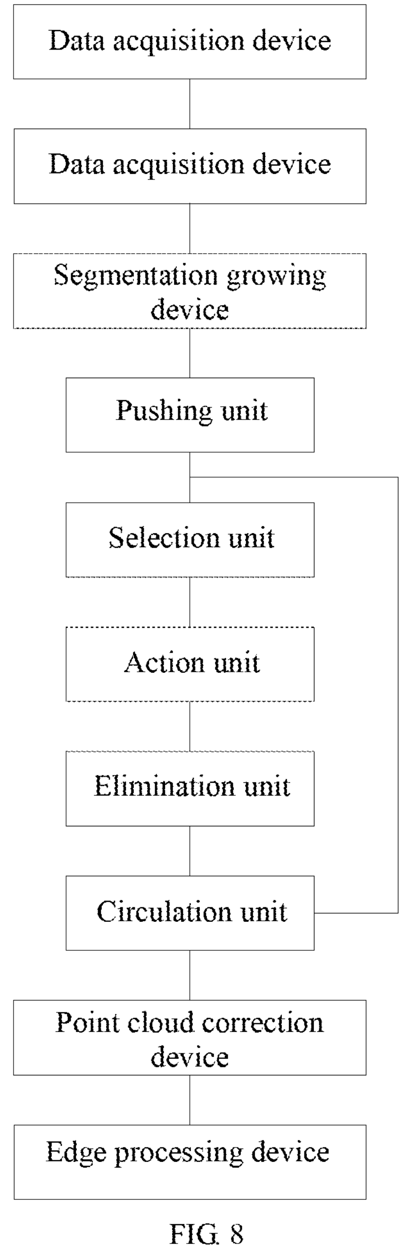
FIG. 8 is a structural diagram of a point cloud flattening device according to Embodiment 3 of the application.

In Embodiment 3, as shown in FIG. 8, the nail shape extraction system and method are described in detail in the presence of the determination condition added in the step of point cloud extraction. Specifically, in Embodiment 3, the point cloud flattening device of the nail shape extraction system comprises a point cloud acquisition module and a point cloud flattening module which are connected to each other, wherein the point cloud acquisition module is connected to the segmentation growing device, and is configured to acquire the curved nail surface point cloud $Cloud_{Nail-s}$ transmitted from the segmentation growing device and convert the curved nail surface point cloud $Cloud_{Nail-s}$ into a flattened point cloud list $\{R_e\}$, and the point cloud flattening module is configured to receive the flattened point cloud list $\{R_e\}$ transmitted from the point cloud acquisition module, establish an empty to-be-flattened point list $\{A_e\}$, and perform a flattening action to flatten the curved nail surface point cloud $Cloud_{Nail-s}$ into a planar nail surface point cloud $Cloud_{Nail-p}$ with the same area.

The point cloud flattening module comprises a pushing unit, a selection unit, a flattening action unit, an elimination unit and a circulation unit. Wherein, an input terminal of the pushing unit is connected to an output terminal of the point cloud acquisition module, an output terminal of the pushing unit is connected to the selection unit, the selection unit, the flattening action unit, the elimination unit and the circulation unit are connected cyclically, and an output terminal of the circulation unit is connected to an input terminal of the device in the step of point cloud flattening.

Figure 9:
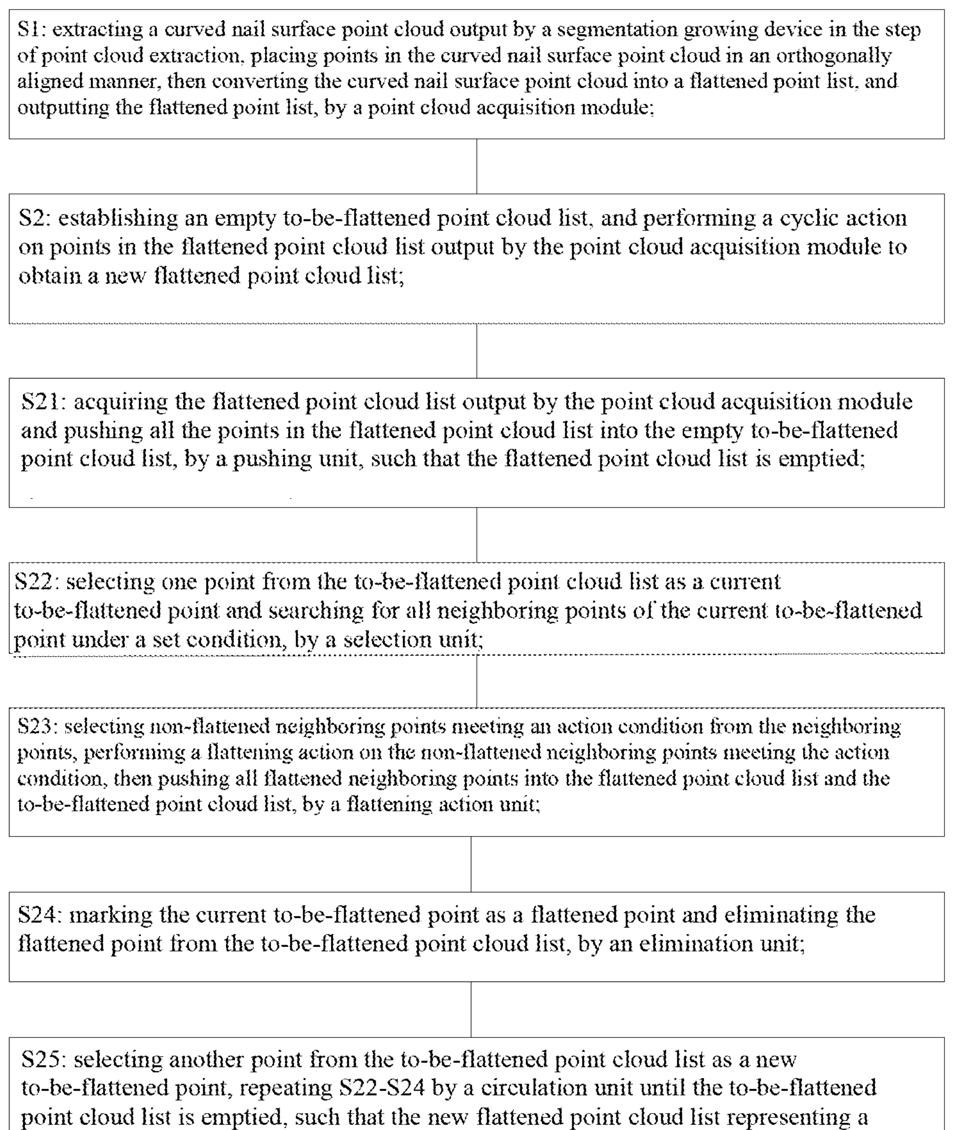
FIG. 9 is a flow diagram of the step of point cloud flattening according to Embodiment 3 of the application.

As shown in FIG. 9, the step of point cloud flattening of the nail shape extraction method using the point cloud flattening device specifically comprises:

S1: extracting the curved nail surface point cloud $Cloud_{Nail-s}$ output by the segmentation growing device, converting the curved nail surface point cloud $Cloud_{Nail-s}$ into a flattened point cloud list $\{R_e\}$ and outputting the flattened point cloud list $\{R_e\}$, by the point cloud acquisition module:

S2: establishing an empty to-be-flattened point cloud list $\{A_e\}$, and performing the following action on points in the flattened point cloud list $\{R_e\}$ output by the point cloud acquisition module to obtain a new flattened point cloud list $\{R_e'\}$:

S21: acquiring the flattened point cloud list $\{R_e\}$ output by the point cloud acquisition module and pushing all the points in the flattened point cloud list $\{R_e\}$ into the empty to-be-flattened point cloud list $\{A_e\}$, by the pushing unit, such that the flattened point cloud list $\{R_e\}$ is emptied:

S22: selecting one point from the to-be-flattened point cloud list $\{A_e\}$ as a current to-be-flattened point $\{A_e\}$ and searching for all neighboring points $\{N_e\}$ of the current to-be-flattened point $P_e$ under a set condition, by the selection unit:

S23: selecting non-flattened neighboring points $N_e(i)$ meeting an action condition from the neighboring points $\{N_e\}$, performing a flattening action on the non-flattened neighboring points $N_e(i)$ meeting the action condition, then pushing all flattened neighboring points $N_e(i)$ into the flattened point cloud list $\{R_e\}$ and the to-be-flattened point cloud list $\{A_e\}$, by the flattening action unit:

S24: marking the current to-be-flattened point $P_e$ as a flattened point and eliminating the flattened point from the to-be-flattened point cloud list $\{A_e\}$, by the elimination unit: and S25: selecting another point from the to-be-flattened point cloud list $\{A_e\}$ as a new to-be-flattened point $P_e'$, repeating S22-S24 by the circulation unit until the to-be-flattened point cloud list $\{A_e\}$ is emptied, such that the new flattened point cloud list $\{R_e'\}$ representing the planar nail point cloud $Cloud_{Nail-p}$ is obtained.

S23 specifically comprises: in the flattening action unit, flattening all the non-flattened neighboring points $N_e(i)$ among the neighboring points $\{N_e\}$ into a set plane, wherein the current to-be-flattened point $\{A_e\}$ preferably also falls within the set plane; then, pushing all the flattened neighboring points $\{N_e\}$ into the to-be-flattened point list $\{A_e\}$ to be used as a new current to-be-flattened point $P_e'$ in next time of flattening. The neighboring points $N_e(i)$ can be flattened in many forms. For example, the neighboring points $N_e(i)$ can be flattened by equal arc lengths or by projection. Flattening by projection means that the neighboring points $N_e(i)$ are orthographically projected on a set plane, and projection points on the set plane are used as flattened neighboring points $N_e'(i)$. In some examples of Embodiment 3, the neighboring points $N_e(i)$ are flattened by equal arc lengths. Specifically, the relative position $\vec{v}$ and distance d from each non-flattened neighboring point $N_e(i)$ to the current to-be-flattened point $P_e$ are calculated, and then each neighboring point $N_e(i)$ is projected onto the set plane by calculation, according to the following formulas:

$$\vec{v} = (Ne_x - P_x Ne_y - P_y) \quad \text{(I)}$$

$$d = \sqrt{(Ne_x - P_x)^2 + (Ne_y - P_y)^2} \quad \text{(II)}$$

$$N_e'(i) = N_e(i) + d \cdot \vec{v} \quad \text{(III)}$$

$Ne_x$ is an x-axis coordinate of the neighboring point $N_e(i)$ in the coordinate system in the point cloud library;

$Ne_y$ is a y-axis coordinate of the neighboring point $N_e(i)$ in the coordinate system in the point cloud library;

$P_x$ is an x-axis coordinate of the current to-be-flattened point $P_e$ in the coordinate system in the point cloud library;

$P_y$ is a y-axis coordinate of the current to-be-flattened point $P_e$ in the coordinate system in the point cloud library.

From the aspect of algorithm flow, the specific process of the step of point cloud flattening is as follows:

Input:

Input the curved nail surface point cloud $Cloud_{Nail-s}$

Input the current to-be-flattened point $P_e$

Output:

Output the flattened point cloud list $\{R_e\}$

Initialize:

Initialize the flattened point cloud list $\{R_e\}$

Initialize the to-be-flattened point list $\{A_e\}$, push all points in the flattened point cloud list $\{R_e\}$ into the to-be-flattened point cloud list $\{A_e\}$ to empty the flattened point cloud list $\{R_e\}$, $\{A_e\} \leftarrow \{R_e\}$ Algorithm loop:

As long as the to-be-flattened point cloud list $\{_e\}$ is not empty,

Select one point from the to-be-flattened point cloud list $\{A_e\}$ as the current to-be-flattened point $P_e$, and Quickly search out N neighboring points $\{N_e\}$ closest to the current to-be-flattened point $P_e$ by Octree For each non-flattened neighboring point $N_e(i)$ among all the neighboring points $\{N_e\}$, calculate:

$$N_e'(i) = N_e(i) + d \times \vec{v}$$

$d_i$ is the relative distance from the neighboring point $N_e(i)$ to the current to-be-flattened point $P_e$ $\vec{v}_I$ is the relative position from the neighboring point $N_e'(i)$ to the current to-be-flattened point $P_e$ Calculate the position of the flattened neighboring point $N_e(i)$ based on the above data, and perform the flattening action Traverse all non-flattened neighboring points $N_g(i)$, which fall within the set plane after being flattened, around the current to-be-flattened point $P_e$, add the flattened neighboring point $N_e'(i)$ into the flattened point list $\{R_e\}$ and the to-be-flattened point list $\{A_e\}$, $\{R_e\} \leftarrow \{R_e\} U \{N_e'\}$ $\{A_e\} \leftarrow \{A_e\} U \{N_e'\}$ Mark the current to-be-flattened point $P_e$ as a flattened point, and eliminate the flattened point from the to-be-flattened point list $\{A_e\}$, $\{A_e\} \leftarrow \{A_e\} \backslash P_e$ Select another point from the to-be-flattened point list $\{A_e\}$ as a new current to-be-flattened point $P_2'$, repeat the above process until the to-be-flattened point list $\{A_e\}$ is emptied, and output a new flattened point list $\{R_e'\}$ representing the planar nail point cloud $Cloud_{Nail-s}$ In Embodiment 3, with the current to-be-flattened point $P_e$ as a central point, 6 neighboring points $\{N_e\}$ closest to the current to-be-flattened point $P_e$ are searched out and flattened respectively.

Point clouds on the outermost circle, representing the contour, of the extracted curved nail surface point cloud $Cloud_{Nail-s}$ are approximately located in a same plane, and the plane is set as a contour plane. The set plane is parallel to the contour plane or coincides with the contour plane.

The position of the set plane is flexible, and the set plane may be located in the contour plane, in the middle section of the curved nail surface point cloud CloudNuil-s, or above the nail surface point cloud $Cloud_{Nail-s}$. In a case where the set plane is located in the middle section of the curved nail surface point cloud $Cloud_{Nail-s}$, points in the curved nail surface point cloud $Cloud_{Nail-s}$ are distributed on two sides of the set plane. In a case where the set plane is located above the curved nail surface point cloud $Cloud_{Nail-s}$, points in the curved nail surface point cloud $Cloud_{Nail-s}$ are all distributed on one side of the set plane, and points, representing the contour, in the curved nail surface point cloud $Cloud_{Nail-s}$ are farther away from the set plane.

In Embodiment 3, the set plane is a plane with a highest point in the curved nail surface point cloud $Cloud_{Nail-s}$ among multiple planes parallel to the contour plane, and the highest point in the curved nail surface point cloud $Cloud_{Nail-s}$ is one or more points, having a maximum vertical distance to the contour plane, in the curved nail surface point cloud $Cloud_{Nail-s}$.

Preferably, the set plane is a plane with the first current to-be-flattened point $P_e$ selected in S22 among multiple planes parallel to the contour plane. In this way, the flattening process can be simplified, and the cycle number is reduced.

In Embodiment 3, in the first cycle, the highest point in the in the curved nail surface point cloud $Cloud_{Nail-s}$ is selected as the current to-be-flattened point $P_e$, then the curved nail surface point cloud $Cloud_{Nail-s}$ is gradually flattened outwards with the highest point in the curved nail surface point cloud $Cloud_{Nail-s}$ as a flattening point, and there are a few errors between the planar surface of the planar nail surface point cloud $Cloud_{Nail-p}$ obtained after flattening and the curved surface of the curved nail surface point cloud $Cloud_{Nail-s}$, such that the obtained planar nail surface point cloud $Cloud_{Nail-p}$ better fits the surface of the target nail.

Preferably, in S1, after the curved nail surface point cloud $Cloud_{Nail-s}$ is acquired and before the curved nail surface point cloud $Cloud_{Nail-s}$ is converted into the flattened point list $\{R_e\}$, the position of the curved nail surface point cloud $Cloud_{Nail-s}$ is corrected to facilitate subsequent calculation. In this case, S1 specifically comprises:

S1: acquiring, by the point cloud acquisition module, the curved nail surface point cloud $Cloud_{Nail-s}$ output by the segmentation growing device in the step of point cloud extraction, placing points in the curved nail surface point cloud $Cloud_{Nail-s}$ in an orthogonally aligned manner, then converting the curved nail surface point cloud $Cloud_{Nail-s}$ into the flattened point list $\{R_e\}$, and outputting the flattened point list $\{R_e\}$.

The specific method for correcting the curved nail surface point cloud $Cloud_{Nail-s}$ in this embodiment is the same as the method used in the step of point cloud correction in Embodiment 1. In this embodiment, the pose and position of the curved nail surface point cloud $Cloud_{Nail-s}$ are transformed to ensure that the centroid of the corrected curved nail surface point cloud $Cloud_{Nail-s}$ coincides with the origin of the coordinate system in the point cloud library, wherein a front end of the nail points to a forward direction of an x-axis of the coordinate system, a left side of the nail points to a forward direction of a y-axis of the coordinate system, and a back of the nail points to a negative direction of a z-axis of the coordinate system.

EMBODIMENT 4

Embodiment 4 of the application provides a manufacturing system for a personalized nail tip, which is designed and implemented based on the nail shape extraction system and method based on point clouds designed in any one of Embodiments 1-3. The actual process or structure of the manufacturing system is similar to that of the nail shape extraction system and method based on point clouds, and also has some differences from that of the nail shape extraction system and method based on point clouds, and these differences will be emphatically described below. Other details that are not described can be considered as the same as those in Embodiments 1-3, and will not be repeated anymore.

Figure 10:
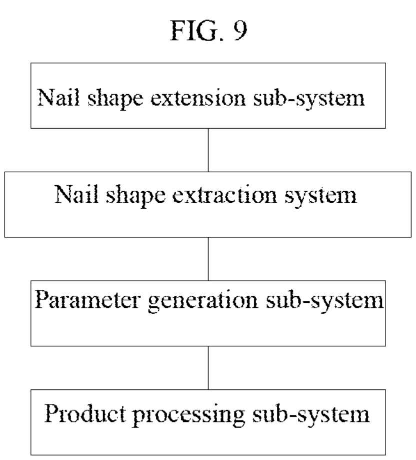
FIG. 10 is a structural diagram of a manufacturing system for a personized nail tip according to Embodiment 4 of the application.

In Embodiment 4, as shown in FIG. 10, the manufacturing system for a personalized nail comprises a nail shape extension sub-system, the nail shape extraction system based on point clouds in any one of Embodiments 1-3, a parameter generation sub-system, and a product processing sub-system, wherein the nail shape extension sub-system, the nail shape extraction system, the parameter generation sub-system and the product processing sub-system are connected in sequence.

Specifically, the connection relation and function of the manufacturing system for a personalized nail are as follows:

The nail shape extension sub-system is configured to extract a 3D shape of a finger with a nail of a user, then measure 3D shape data of the finger, and transmit a measurement result to the nail shape extraction system:

The nail shape extraction system based on point clouds is configured to convert the 3D shape data of the finger output by the nail shape extension sub-system into a 3D point cloud, extract a curved nail point cloud from the 3D point cloud, flatten the curved nail point cloud into a planar point cloud, extract a nail point cloud representing a contour from the planar point cloud, and then transmit the nail point cloud representing the contour to the parameter generation sub-system in the form of 2D shape data;

The parameter generation sub-system is configured to combine the 2D shape data of the planar nail contour output by the nail shape extraction system based on point clouds and parameters of a personalized nail tip selected by a customer to generate a 2D digital model of the personalized nail tip, convert the generated 2D digital model into processing parameters, and transmit the processing parameters to the product processing sub-system;

The product processing sub-system is configured to process a to-be-processed material into the personalized nail tip according to the processing parameters output by the parameter generation sub-system.

Figure 11:
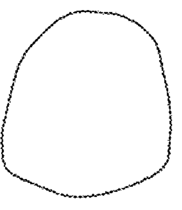
FIG. 11 is a structural diagram of a personalized nail tip according to Embodiment 4 of the application.

Embodiment 4 of the application further provides a nail tip. As shown in FIG. 11, the nail tip is a personalized nail tip which is manufactured through the manufacturing system for a personalized nail tip in this embodiment. Although the manufactured nail tip is planar, it can perfectly fit the curved surface and contour of the nail of a target finger and thus can well fit the nail.

What is claimed is:

1. A nail shape extraction system based on point clouds, comprising a cyclic processing device for processing point clouds, wherein the cyclic processing device comprises:

a point cloud acquisition module configured to acquire point cloud data, convert the acquired point cloud data into a point cloud list, and output the point cloud list; and a point cloud processing module connected to the point cloud acquisition module, and configured to perform a cyclic action on points in the point cloud list output by the point cloud acquisition module to obtain a new point cloud list;

the point cloud processing module comprises:

a pushing unit connected to the point cloud acquisition module, and configured to acquire the point cloud list output by the point cloud acquisition module and push all the points in the point cloud list into an empty to-be-acted point list;

a selection unit connected to the pushing unit, and configured to select one point from the to-be-acted point list as a current to-be-acted point and search for all neighboring points of the current to-be-acted point under a set condition;

an action unit connected to the selection unit, and configured to select neighboring points meeting an action condition from the neighboring points, classify the neighboring points to select a growing action or a flattening action and then push the neighboring points meeting the action condition into the point cloud list and the to-be-acted point list;

an elimination unit connected to the action unit, and configured to mark the current to-be-acted point as an acted point and eliminate the acted point from the to-be-acted point list; and a circulation unit connected to the selection unit, the action unit and the elimination unit, and configured to promote the selection unit, the action unit and the elimination unit to act cyclically until the to-be-acted point list is emptied to obtain the new point cloud list.

2. The nail shape extraction system based on point clouds according to claim 1, wherein in the action unit, a normal vector angle between each non-acted neighboring point among the neighboring points and the current to-be-acted point is calculated; if the normal vector angle between the non-acted neighboring point and the current to-be-acted point is less than or equal to an angle threshold, the non-acted neighboring point is marked as a to-be-further-acted point; otherwise, the non-acted neighboring point is marked as a not-to-be-further-acted point;

a maximum area among areas with multiple continuous acted points and/or to-be-further-acted points is determined as a suitable action range, and the to-be-further-acted points within the suitable action range are pushed into the point cloud list and the to-be-acted point list.

3. The nail shape extraction system based on point clouds according to claim 2, wherein in the action unit, a space around the current to-be-acted point is equally divided into n areas with the current to-be-acted point as a central point, numbers of different types of neighboring points in each area are compared to select to-be-acted candidate areas, and then the to-be-acted candidate area with a maximum angle is determined as the suitable action range around the current to-be-acted point;

the to-be-acted candidate areas are selected according to the following condition:

areas where to-be-further-acted points are more than other types of points are determined as to-be-further-acted areas, areas without point clouds and areas where not-to-be-further-acted points are more than other types of points are determined as not-to-be-acted areas, areas where acted points are more than other types of points are determined as acted areas, and adjacent to-be-further-acted areas and/or acted areas are integrated into the to-be-acted candidate areas; or areas where the sum of the number of to-be-further-acted points and the number of acted points is not less than the number of not-to-be-further-acted points are determined as to-be-further-acted areas, areas without point clouds and areas where the sum of the number of to-be-further-acted points and the number of acted points is less than the number of not-to-be-further-acted points are determined as not-to-be-acted areas, and adjacent to-be-further-acted areas are integrated into the to-be-acted candidate areas; or areas only comprising to-be-further-acted points and/or acted points are determined as to-be-further-acted areas, and areas without point clouds and areas comprising not-to-be-further-acted points are determined as not-to-be-acted areas, and adjacent to-be-further-acted areas are integrated into the to-be-acted candidate areas.

4. The nail shape extraction system based on point clouds according to claim 1, wherein in the action unit, each non-acted neighboring point among the neighboring points is flattened to fall into a set plane, and then each flattened neighboring point is pushed into the point cloud list and the to-be-acted point list and is taken as a new current to-be-acted point in next time of flattening;

the set plane is parallel to a plane formed by point clouds, representing a contour, among to-be-flattened point clouds.

5. The nail shape extraction system based on point clouds according to claim 4, wherein in the action unit, the neighboring points of the current to-be-acted point are flattened by equal arc lengths or by projection.

6. The nail shape extraction system based on point clouds according to claim 4, wherein in the selection unit, a first selected current to-be-acted point falls within the set plane.

7. The nail shape extraction system based on point clouds according to claim 1, wherein in the selection unit, the selected neighboring points are all points within a set search radius, with the current to-be-acted point as a center; or in the selection unit, the selected neighboring points are a set number N of points closest to the current to-be-acted point.

8. The nail shape extraction system based on point clouds according to claim 1, wherein the nail shape extraction system based on point clouds further comprises:

a point cloud correction device connected to the cyclic processing device, and configured to transform a pose and position of the point clouds to a preset pose and position, and transmit the transformed point clouds to the cyclic processing device.

9. The nail shape extraction system based on point clouds according to claim 1, wherein the nail shape extraction system based on the point clouds further comprises:

an edge processing device connected to the cyclic processing device, and configured to perform edge processing on a point cloud data transmitted by the cyclic processing device to make an edge smooth.

10. A nail shape extraction system based on point clouds, comprising a step of cyclic processing of point clouds, wherein the step of cyclic processing comprises:

S1: acquiring point cloud data, converting the acquired point cloud data into a point cloud list and outputting the point cloud list, by a point cloud acquisition module; and S2: establishing an empty to-be-acted point list, performing, by a point cloud processing module, a cyclic action on points in the point cloud list output by the point cloud acquisition module, and obtaining a new point cloud list;

S2 comprises:

S21: acquiring the point cloud list output by the point cloud acquisition module and pushing all the points in the point cloud list into the empty to-be-acted point list, by a pushing unit, such that the point cloud list is emptied;

S22: selecting one point from the to-be-acted point list as a current to-be-acted point and searching for all neighboring points of the current to-be-acted point under a set condition, by a selection unit;

S23: selecting neighboring points meeting an action condition from the neighboring points, classifying the neighboring points to select a growing action or a flattening action and then pushing non-acted neighboring points meeting the action condition into the point cloud list and the to-be-acted point list, by an action unit;

S24: marking the current to-be-acted point as an acted point and eliminating the acted point from the to-be-acted point list, by an elimination unit; and S25: selecting another point from the to-be-acted point list as a new current to-be-acted point, and repeating S22-S24 by a circulation unit until the to-be-acted point list is emptied to obtain the new point cloud list.

11. A non-transitory computer-readable storage medium, having a computer program instruction stored therein, wherein when the computer program instruction is executed by a processor, the steps of the nail shape extraction system based on point clouds according to claim 10 are performed.

12. A manufacturing system for a personalized nail tip, comprising a nail shape extension sub-system, the nail shape extraction system based on point clouds according to claim 1, a parameter generation sub-system, and a product processing sub-system, wherein the nail shape extension sub-system, the nail shape extraction system, the parameter generation sub-system and the product processing sub-system are connected in sequence;

the nail shape extension sub-system is configured to extract a 3D shape of a finger with a nail of a user, then measure 3D shape data of the finger, and transmit a measurement result to the nail shape extraction system;

the nail shape extraction system based on point clouds is configured to convert the 3D shape data of the finger output by the nail shape extension sub-system into a 3D point cloud, extract a curved nail point cloud from the 3D point cloud, flatten the curved nail point cloud into a planar point cloud, extract a nail point cloud representing a contour from the planar point cloud, and then transmit the nail point cloud representing the contour to the parameter generation sub-system in the form of 2D shape data;

the parameter generation sub-system is configured to combine the 2D shape data of the planar nail contour output by the nail shape extraction system based on point clouds and parameters of a personalized nail tip selected by a customer to generate a 2D digital model of the personalized nail tip, convert the generated 2D digital model into processing parameters, and transmit the processing parameters to the product processing sub-system;

the product processing sub-system is configured to process a to-be-processed material into the personalized nail tip according to the processing parameters output by the parameter generation sub-system.

13. A personalized nail tip, wherein the nail tip is a personalized nail tip manufactured through the manufacturing system for a personalized nail tip according to claim 12.

* * * * *